(12) United States Patent
McClelland

(10) Patent No.: X4614
(45) Date of Patent: Dec. 28, 1826

(54) PACKING COTTON

(76) Inventor: James McClelland

James M. McClelland a Resident two years & upwards in the United States

Letters Patent

Dated December 25th 1826

The Schedule referred to in these Letters Patent, & making part of the same, containing a description in the words of the said James M. McClelland himself of his improvement in the machine for pressing or packing cotton.

---

The principle of this invention consists, first, in the use of a <u>lever</u> of the second order (the direction of its motion being perpendicular to the horizon) secondly in a <u>screw</u> standing perpendicular to the power end of the lever to which it is attached, & third of a <u>lever wheel</u> & <u>axle</u>, with a <u>rack</u> & <u>pinion</u> for hoisting & lowering the rammer of the cotton into which it works.

The operation of this machine is first (after the cotton is put into the packing box) by turning the <u>lever wheel</u>, which turns the <u>axle</u>, which presses down the rammer of the cotton to a certain point, corresponding to the power applied; 2nd by bringing the great lever (which during the first operation is slid on one side) over the rammer, which serves it as a fulcrum & turning the <u>screw</u> at the power end of the lever by means of hand spikes, which by means of a <u>female screw</u> block above, presses down the end of the lever which remains fixed at the other end, & thus completes the operation of packing the cotton.—

The lever not having a sufficient length of lift for motion of the fulcrum point to give depth of box for the cotton, is made to slide to one side making way for the rammer to pass up high enough to admit the cotton which is done by the rack & pinion method already mentioned.

The <u>effective</u> power produced by means of this arrangement of lever & screw is equal to 50,000 pounds from the exertion of one man, which enables two men with ease to pack 5100 wt of cotton in the common space allowed in the square bags— the length of the lever from the fulcrum is in this case 16 feet 6 inches.

Witnesses
Jobt Miller
Henry M. Dashiell

James M. McWilliams (372 words)

Evidt
Pltff.